L. B. TYNG.
Car Wheel.
No. 24,678. Patented July 5, 1859.
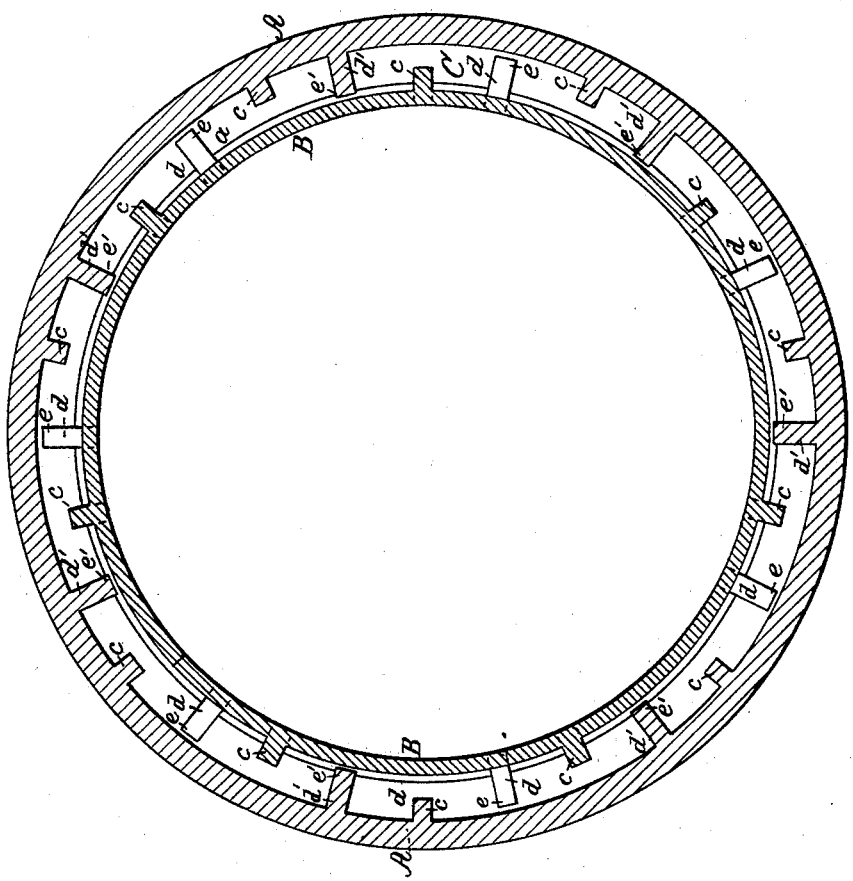
Witnesses:
R. S. Spencer
E. Wolff
Inventor:
L. B. Tyng

UNITED STATES PATENT OFFICE.

LEVI BARTLETT TYNG, OF LOWELL, MASSACHUSETTS.

CAST-IRON TIRE FOR RAILROAD-WHEELS.

Specification of Letters Patent No. 24,678, dated July 5, 1859.

*To all whom it may concern:*

Be it known that I, LEVI BARTLETT TYNG, of Lowell, in the county of Middlesex and State of Massachusetts, have invented a new and Improved Hollow Cast-Iron Tire for Railroad-Wheels; and I do hereby declare that the following is a full, clear, and exact description of the same, reference being had to the accompanying drawings, forming a part of this specification, in which—

Figure 1 is a vertical section of my tire taken in a plane at right angles to the axle of the wheel and through the rim of the tire. Fig. 2 is a transverse vertical section of ditto.

Similar letters of reference, in both views, indicate corresponding parts.

It has long been a desideratum to construct chilled hollow cast iron tires, which combine lightness and durability with strength so that a wheel with such tire is not only able to carry the same load as a wheel with solid tire, but also that the tire is not so liable to crack from the unequal expansion or contraction of its different parts. Solid cast iron tire is not only very clumsy, but it is also very liable to crack as its sides are not of the same strength and thickness of metal, and, in the same measure, when the tire is cast hollow, with its inner and outer rim united by bridges, nothing is gained as far as the durability is concerned, neither of the rims being able to expand, or contract independent from the other.

To overcome this difficulty, without impairing the strength of the wheel is the object of my invention, which consists in casting the inner rim of the tire with a continuous slot or groove leaving the outer rim free to expand and contract independently from the inner one, and in strengthening the tread of the wheel by wedge shaped braces cast alternately to the inner and to the outer rim, the points of those on the inner rim reaching close up to the under side of the outer rim, and the points of those on the outer rim reaching close up to the upper side of the inner rim leaving a continuous chamber between the two rims, whereby my tire is rendered full as strong as those having their rims united by a series of bridges or partitions without subjecting it to the same liability to crack from the unequal expansion of its parts.

To enable those skilled in the art to make and use my invention I will proceed to describe it.

The outer rim, A, and the inner rim, B, of the tire are united on their sides or ends by walls, $a$ $a'$, leaving a chamber, C, between them, which extends all the way around the tire. A continuous groove, $b$, is made in the inner rim extending through its middle to the chamber, C.

Each of the rims is strengthened by ribs, $c$, which extend through from one of the side walls, $a$, to the other, $a'$, projecting from each of the rims about half way through the chamber, C, and they are attached to, or cast with the rims at equal distances from each other, those on the inner rim being placed about midway between those on the outer rim. In order to strengthen the tread of the wheel I use wedge-shaped braces, $d$ $d'$, which are cast alternately to one or to the other of the side walls, $a$ $a'$, of the tire, the braces, $d$, being also cast with the inner rim, B, so as to fill up the corner formed by the same and by the side wall, $a$, and they extend with their points, $e$, close up to the outer rim, A, without being rigidly attached to it, and the braces, $d'$, are cast to the outer rim, A, so as to fill up the corners between this rim and between the side wall, $a'$, and their points, $e'$, come close up to the inner rim, $a$, without, however, being united with the same. It is, in no case, necessary to make these braces, or the ribs, $c$, any wider than half an inch, and they are cast with the inner rim in such a manner, that they partly fill up the groove, $b$, leaving the largest portion of that groove open, and in direct communication with the chamber C, which latter is in no place completely closed. By this arrangement of the braces, $d$ $d'$, together with the groove, $b$, the rims are properly supported without tying them together, which is the case when partitions are used for the purpose of supporting the rims, and my tire is lighter and less liable to sustain any injury by changes of temperature, or from any other cause than other chilled cast iron tire.

What I claim as new and desire to secure by Letters Patent is:—

1. The wedge shaped braces, $d$ $d'$, arranged in the chamber, C, between the rims, A and B, of a hollow cast iron tire, so that the chamber is continuous throughout, substantially as and for the purpose set forth.

2. In combination with the continuous chamber, C, I claim the groove, b, in the inner rim arranged substantially as and for the purpose described.

3. Arranging the ribs, c, alternately on the inner and outer rim for the purpose of strengthening them without tying them together substantially as described.

L. B. TYNG.

Witnesses:
R. S. SPENCER,
J. W. COOMBS.